S. G. Crane,
Skate,
Nº 36,819.   Patented Oct. 28, 1862.
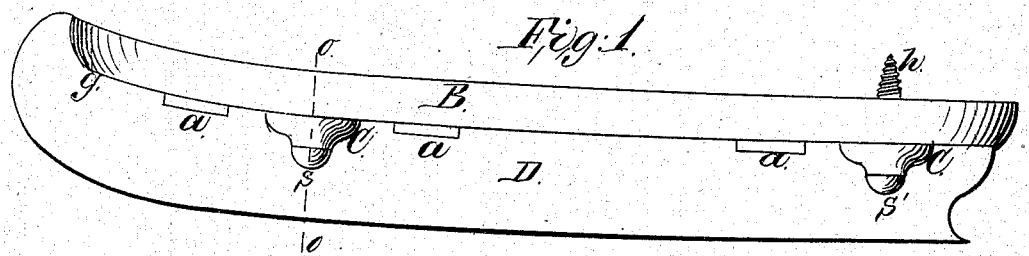
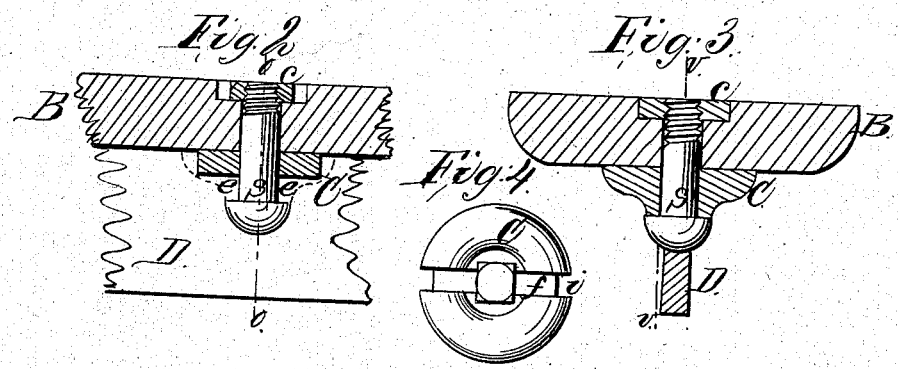
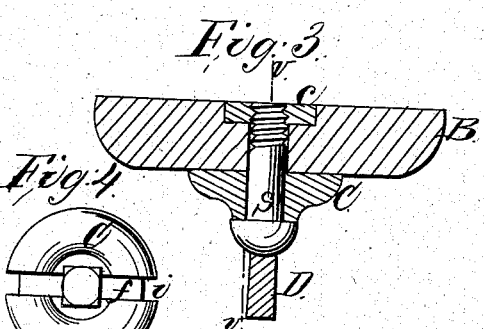
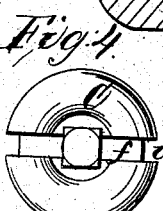
Witnesses
G. W. Martin
N. B. Phelps
Inventor:
S. G. Crane.

UNITED STATES PATENT OFFICE.

SAMUEL G. CRANE, OF ROCHESTER, NEW YORK, ASSIGNOR TO D. R. BARTON, OF SAME PLACE.

IMPROVEMENT IN SKATES.

Specification forming part of Letters Patent No. 36,819, dated October 28, 1862.

*To all whom it may concern:*

Be it known that I, SAMUEL G. CRANE, of Rochester, in the county of Monroe and State of New York, have invented an Improved Fastening for Skate-Woods; and I do hereby declare that the following is a full, clear, and exact description thereof, reference being had to the annexed drawings, making a part of this specification, in which—

Figure 1 is a side elevation of the skate. Fig. 2 is a section taken through the collar C, foot-piece B, and nut $c$ in the direction of the red line $v$ in Fig. 3. Fig. 3 is a transverse section through the plane indicated by the red lines $o$ in Figs. 1 and 2. Fig. 4 is a bottom view of the collar C. Figs. 2, 3, and 4 are enlarged views, being full size.

Similar letters of reference indicate corresponding parts in the several figures.

The nature of this invention will be understood by reference to the drawings and specification.

To enable others to make and use my invention, I will proceed to describe its construction, &c.

The runner-plates D are cut from bars rolled with one edge thick and the other thin, as seen in Fig. 3, whereby they require no forging in their manufacture, except to give them the desired curvature. The nicks $a$, for the foot-straps to pass through, are punched out, as are also the recesses in which the body and head of the screws $s$ and $s'$ are fitted, and in which the bodies of the collars C are placed, as seen in Fig. 2. Said collars C may be shaped externally as shown in the drawings, or in any other desired form, and they are cast with a groove, $f$, Fig. 4, running across the lower face, to correspond to the thickness of the runner at that point, and there is also a notch, $i$, at each end of the groove, running through to the upper face of the collar, thus leaving the body or solid portion of it rectangular, as seen in Fig. 2, the screw-hole passing through the center, as seen in Fig. 4. The foot-piece B is shaped to conform to the curve of the upper edge of the runner D, and it is bored to fit the round portion of the body of the screws $s$ and $s'$, and also to receive the nuts $c$. The runner D is let into the toe of the foot-piece, as indicated by the red line $g$, Fig. 1. The screws $s$ and $s'$ are placed in their position in the runner D, where the heads are held by the projections $e$, Fig. 2. The collars C are then turned with the groove $f$ parallel with the runner and slipped on over the screws, and those portions forming the sides of the grooves, as indicated by the dotted lines in Fig. 2, clamp the upper edge of the runner, and when the foot-piece is secured in position by the nuts $c$ the parts are all firmly and securely connected together. The screws $s$ and $s'$ have that portion of the body next the head between the projections $e$ made square, as seen in Figs. 2 and 3, which effectually prevents their turning when the nuts $c$ are screwed on or off, and also prevents the screw $s'$ from turning when the heel-spur $h$, which is a continuation of the said screw, is being attached to or removed from the boot, which is an important item. It will be seen that the collars C act as lateral braces or supports to the foot-piece B, to enable it to resist side thrusts or strains against the lower edge of the runner D, causing said strains to center in the screws $s$ and $s'$ and the collars C, instead of in the foot-piece at the point of contact with the runner D, as in the ordinary construction of this class of skates, and by clutching the screw-heads to the projections $e$ at a point so much below the foot-piece the leverage resulting from said strains is so much diminished that the parts are capable of resisting almost any amount of such strain that may be brought to bear upon them.

What I claim as my invention is—

Connecting the foot-piece B and the runner D of skates substantially in the manner specified—viz., by placing the clamping-points $e$ at least one-fourth of the width of the runner below the foot-piece—in combination with the collar C, when the latter is constructed as described and is placed entirely below the lower face of the foot-piece, in the manner and for purposes specified.

S. G. CRANE.

Witnesses:
G. W. MARTIN,
N. B. PHELPS.